(12) United States Patent
Katagiyama et al.

(10) Patent No.: US 7,720,345 B2
(45) Date of Patent: May 18, 2010

(54) OPTICAL CONNECTOR ASSEMBLING JIG

(75) Inventors: Naoki Katagiyama, Tokyo (JP);
Makoto Sanguu, Tokyo (JP); Kazuhiro Aihara, Tokyo (JP); Hiroshii Yamamoto, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 12/284,507

(22) Filed: Sep. 23, 2008

(65) Prior Publication Data
US 2009/0116794 A1 May 7, 2009

(51) Int. Cl.
*G02B 6/00* (2006.01)
(52) U.S. Cl. .................... 385/137; 385/134; 385/136; 385/147
(58) Field of Classification Search .............. 385/134, 385/137, 147
See application file for complete search history.

(56) References Cited
U.S. PATENT DOCUMENTS

| | | | | |
|---|---|---|---|---|
| 5,261,020 | A * | 11/1993 | de Jong et al. | 385/76 |
| 5,442,724 | A * | 8/1995 | Deuel | 385/134 |
| 6,439,780 | B1 * | 8/2002 | Mudd et al. | 385/83 |
| 7,194,179 | B1 * | 3/2007 | Bryant et al. | 385/134 |
| 7,280,733 | B2 * | 10/2007 | Larson et al. | 385/139 |
| 7,295,746 | B2 | 11/2007 | Koreeda et al. | |
| 7,346,256 | B2 * | 3/2008 | Marrs et al. | 385/137 |
| 7,369,738 | B2 * | 5/2008 | Larson et al. | 385/134 |
| 7,412,145 | B2 * | 8/2008 | Honma et al. | 385/134 |
| 7,466,891 | B2 * | 12/2008 | Wagner et al. | 385/139 |
| 7,484,898 | B2 | 2/2009 | Katagiyama et al. | |
| 2008/0138016 | A1 | 6/2008 | Katagiyama et al. | |

FOREIGN PATENT DOCUMENTS

| | | |
|---|---|---|
| JP | 2000-089059 | 3/2000 |
| JP | 2005-292643 | 10/2005 |
| JP | 2008-145865 | 6/2008 |

* cited by examiner

*Primary Examiner*—Ryan Lepisto
(74) *Attorney, Agent, or Firm*—Collard & Roe, P.C.

(57) ABSTRACT

An assembling jig for assembling an optical connector is provided. The optical connector has a pair of beam portions having elasticity and adapted to hold a ferrule holding an optical fiber. The assembling jig includes a body portion, an optical connector receiving portion movably held by the body portion and adapted to receive the optical connector, a ferrule receiving portion movably held by the body portion and adapted to receive the ferrule, and an abutting portion adapted to abut the pair of beam portions to open the pair of beam portions outward.

8 Claims, 9 Drawing Sheets

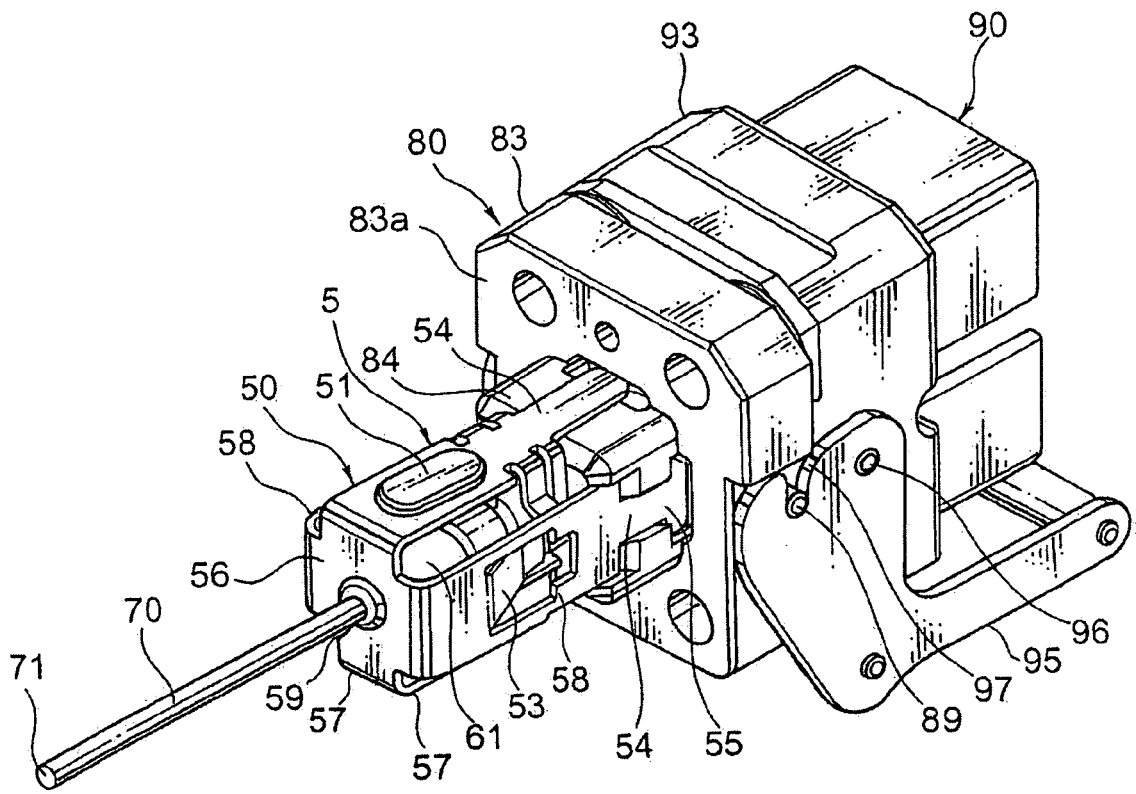
PRIOR ART  FIG. 3
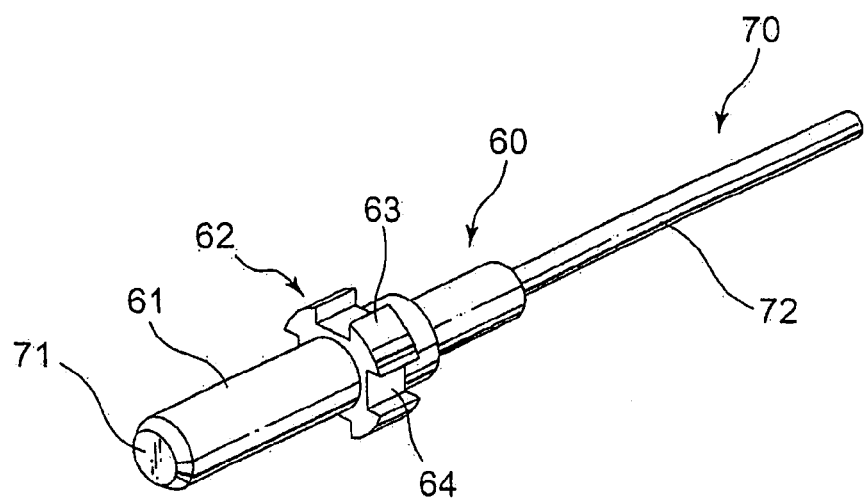
PRIOR ART  FIG. 4

OPTICAL CONNECTOR ASSEMBLING JIG

This application is based upon and claims the benefit of priority from Japanese Patent Application No. 2007-285580, filed on Nov. 1, 2007, the disclosure of which is incorporated herein in its entirety by reference.

BACKGROUND OF THE INVENTION

1. Field of the Invention

This invention relates to an assembling jig for an optical connector that receives and holds a ferrule having an optical fiber and, more specifically, relates to an assembling jig that can easily perform the assembly of such an optical connector.

2. Description of Related Art

Related attaching/detaching jigs for optical connectors are described in Japanese Patent (JP-B) No. 3354503 (Patent Document 1) and Japanese Unexamined Patent Application Publication (JP-A) No. 2005-292643 (Patent Document 2), respectively.

FIG. 1A is a diagram showing a ferrule pulled-out state of an optical connector 105 according to Patent Document 1 and FIG. 1B is a partly sectioned side view of the optical connector 105.

Referring to FIGS. 1A and 1B, the optical connector 105 comprises a housing 110 and a ferrule 120 attached to the housing 110.

The housing 110 has a pair of locking pieces 111 on its optical fiber connection side. Each locking piece 111 has a locking portion 112 on the optical fiber connection side. The locking portions 112 serve to lock a flange portion 123 of the ferrule 120 at a position where the locking pieces 111 are closed to each other, thereby holding an attached state of the ferrule 120 as shown in FIG. 1B. The locking pieces 111 are elastically openable from the closed position described above to a releasing position where the attached state of the ferrule 120 can be released.

The ferrule 120 comprises a connection-side portion 121 located on the optical fiber connection side of the optical connector 105, a fitting-side portion 122 located on the mating optical connector fitting side opposite to the optical fiber connection side of the optical connector 105, and the flange portion 123 located between the connection-side portion 121 and the fitting-side portion 122. An optical fiber 106 is connected to the ferrule 120.

As shown in FIG. 1A, a ferrule attaching/detaching tool 125 is integrally formed of a plastic material into a U-shape in cross section as a whole. The ferrule attaching/detaching tool 125 has, on its base side at a right end in the figure, a grip portion for gripping by fingers of an operator and, on its distal end side, a pair of elastic grasping pieces 126 continuous with the grip portion and capable of grasping therebetween the connection-side portion 121 of the ferrule 120. The thickness of each elastic grasping piece 126 is set so that when the elastic grasping pieces 126 are inserted between the locking pieces 111 so as to face the locking pieces 111 and grasp therebetween the connection-side portion 121 of the ferrule 120, the locking pieces 111 are opened to the releasing position. On the other hand, the elastic grasping pieces 126 are each formed with cutouts that serve to prevent the locking pieces 111 from being opened to the releasing position when the elastic grasping pieces 126 are inserted between the locking pieces 111 so as not to face the locking pieces 111, i.e. so as to be perpendicular to the locking pieces 111, while grasping therebetween the connection-side portion 121 of the ferrule 120.

In the ferrule attaching/detaching tool 125, the cutouts are formed on both sides of each elastic grasping piece 126 only at its free end and the bottom of the tool 125 is cut out at its portion corresponding to the cutouts.

Next, a description will be given of operations of attaching and detaching the ferrule 120 of the optical connector 105 by the use of the ferrule attaching/detaching tool 125 having the structure described above.

At first, in order to pull out the ferrule 120 attached to the housing 110 as shown in FIG. 1B, the operator holds the grip portion of the ferrule attaching/detaching tool 125 so that the pair of elastic grasping pieces 126 are oriented for insertion between the pair of locking pieces 111 of the optical connector 105 so as to face the locking pieces 111. While holding the ferrule attaching/detaching tool 125 in this manner, the operator pushes the elastic grasping pieces 126 in between the locking pieces 111 until end faces of the elastic grasping pieces 126 butt against an abutment surface of the flange portion 123 of the ferrule 120 so that the elastic grasping pieces 126 are placed between the locking pieces 111 so as to face the locking pieces 111 and grasp therebetween the connection-side portion 121 of the ferrule 120. In this pushed state, the connection-side portion 121 of the ferrule 120 is completely grasped between the elastic grasping pieces 126 and, simultaneously, the locking pieces 111 are opened outward to the releasing position where the locking of the flange portion 123 of the ferrule 120 by the locking portions 112 is released. Therefore, by retreating the ferrule attaching/detaching tool 125, the operator can pull out the ferrule 120 from the housing 110 of the optical connector 105.

Then, in order to attach the ferrule 120 thus pulled out back to the housing 110 of the optical connector 105 again, the operator, while grasping the ferrule 120 between the elastic grasping pieces 126, rotates the ferrule attaching/detaching tool 125 by 90 degrees so that the elastic grasping pieces 126 are oriented for insertion between the locking pieces 111 of the optical connector 105 so as not to face the locking pieces 111. Then, the operator pushes the ferrule 120 into the housing 110 of the optical connector 105 so that the fitting-side portion 122 of the ferrule 120 is inserted between the locking pieces 111 and then the flange portion 123 of the ferrule 120 pushes open the locking portions 112 of the locking pieces 111. Then, when the flange portion 123 of the ferrule 120 rides over the locking portions 112 of the locking pieces 111, the operator retreats and pulls out the ferrule attaching/detaching tool 125. In this event, since the cutouts are provided on both sides of each elastic grasping piece 126 at its free end, the locking pieces 111 are maintained in the closed position. Therefore, since the flange portion 123 of the ferrule 120 is locked by the locking portions 112 of the locking pieces 111, the ferrule 120 is retained at an attaching position in the housing 110 and is never pulled out while being grasped between the elastic grasping pieces 126 of the ferrule attaching/detaching tool 125.

FIG. 2A is a perspective view of an optical connector and a disassembling jig according to Patent Document 2 and FIG. 2B is a diagram showing a state where a stopper 144 is pushed out of a shell member 142 by a reaction force (expansion force) of a coil spring.

As shown in FIGS. 2A and 2B, a disassembling jig 151 comprises a body 152 and releasing portions 154 fixed to the body 152 on both sides thereof by two screws 153 on each side. Each releasing portion 154 has a tapered portion 154*a* and a recessed portion (groove) 154*b* formed at its free end.

An optical connector 141 comprises a shell member (plug frame) 142, an internal member (not shown) disposed in the shell member 142, a stopper 144 attached to the shell member 142, and a coil spring interposed between the internal member and the stopper 144.

An optical fiber 150 is connected to the internal member and the coil spring constantly urges the internal member in a direction of fitting with a mating optical connector.

The shell member 142 is provided with slits (insertion portions) 142a at both side portions thereof on its one end side and is further provided with two windows (engaging portions) 142b in each of upper and lower surfaces thereof on the one end side. The shape of the stopper 144 is trapezoidal when seen from above and is rectangular when seen from the side. The stopper 144 is provided with projecting locking portions 144a, in correspondence with the engaging portions 142b, on upper and lower surfaces thereof near its one end. The shell member 142 is made of a synthetic resin and is elastically deformable and, therefore, the locking portions 144a are engageable and disengageable with respect to the corresponding engaging portions 142b.

Next, a description will be given of operations of disassembling the optical connector 141 by the use of the disassembling jig 151 according to Patent Document 2.

At first, the tapered portions 154a of the disassembling jig 151 are inserted into the slits 142a of the shell member 142, respectively, then, the slits 142a are opened so that the stopper 144 is received in a receiving portion 151a of the disassembling jig 151.

Specifically, when the slits 142a are opened, the engaging portions 142b on the upper side of the shell member 142 move upward and the engaging portions 142b on the lower side thereof move downward, and therefore, the locking portions 144a of the stopper 144 are disengaged or released from the engaging portions 142b, respectively. Consequently, by a reaction force of the compressed coil spring, the stopper 144 is detached from the shell member 142 and moves deep into the receiving portion 151a of the disassembling jig 151.

Then, by pulling the optical fiber 150, the disassembling jig 151, and the stopper 144 with fingers of an operator, the internal member is pulled out of the shell member 142.

SUMMARY

The ferrule attaching/detaching jig for an optical connector described in Patent Document 1 has the structure that is only applicable to a ferrule like the ferrule having the rectangular parallelepiped connection-side portion 121 as shown in FIG. 1B.

Many ferrules currently used mainly in single-core optical connectors each have no rectangular parallelepiped connection-side portion 21, but each have a cylindrical flange portion.

That is, in the case of the optical connector using the ferrule having the cylindrical flange portion, if the ferrule attaching/detaching jig for an optical connector described in Patent Document 1 is used, it is difficult to hold the ferrule in a fixed direction because the ferrule rotates.

Further, the ferrule attaching/detaching jig for an optical connector described in Patent Document 1 is integrally formed of the plastic material. However, since the jig is made of the plastic material, its strength is reduced as compared with that of a metal jig and thus the possibility of breakage increases under conditions that the use frequency of the jig is high.

On the other hand, the optical connector disassembling jig described in Patent Document 2 can only be used for disassembly of an optical connector. Further, in the case of an optical connector having no coil spring inside, it is impossible to use a reaction force of a coil spring and thus the disassembly is difficult.

As described above, the related optical connector assembling/disassembling jigs have problems such that it can be used only when a certain particular ferrule is used, it can be used only for disassembly, and it cannot be used for an optical connector with a different internal structure.

It is therefore an object of this invention to eliminate the drawbacks of the related ferrule attaching/detaching jig for an optical connector and to provide an assembling jig that can easily assemble and disassemble an optical connector.

According to this invention, there is provided an optical connector assembling jig for assembling an optical connector, the optical connector comprising a pair of beam portions having elasticity and adapted to hold a ferrule holding an optical fiber, the optical connector assembling jig comprising a body portion, an optical connector receiving portion movably held by the body portion and adapted to receive the optical connector, a ferrule receiving portion movably held by the body portion and adapted to receive the ferrule; and an abutting portion adapted to abut the pair of beam portions to open the pair of beam portions outward, wherein the optical connector is assembled by receiving and holding the optical connector at the optical connector receiving portion, moving the optical connector receiving portion to open the pair of beam portions outward by the abutting portion, receiving and holding the ferrule at the ferrule receiving portion, and moving the ferrule receiving portion toward the optical connector receiving portion.

According to this invention, it is possible to eliminate the drawbacks of the related ferrule attaching/detaching jig for an optical connector and to provide an assembling jig that can easily assemble and disassemble an optical connector.

BRIEF DESCRIPTION OF THE DRAWINGS

The above features and advantages of the present invention will be more apparent from the following description of certain preferred embodiments taken in conjunction with the accompanying drawings, in which

FIG. 3 is a perspective view showing an optical connector according to an embodiment of this invention;

FIG. 4 is a perspective view showing a ferrule of the optical connector shown in FIG. 3;

DETAILED DESCRIPTION OF PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Hereinbelow, an embodiment of this invention will be described with reference to the drawings.

Figure 1A:
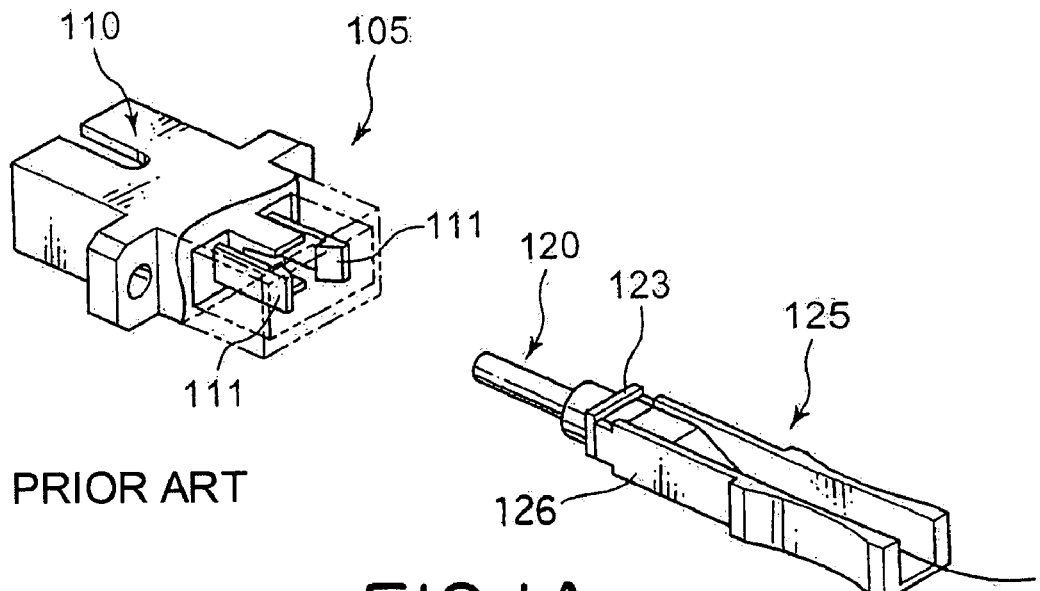
FIG. 1A is a diagram showing a ferrule pulled-out state of an optical connector 105 according to Patent Document 1.
Figure 1B:
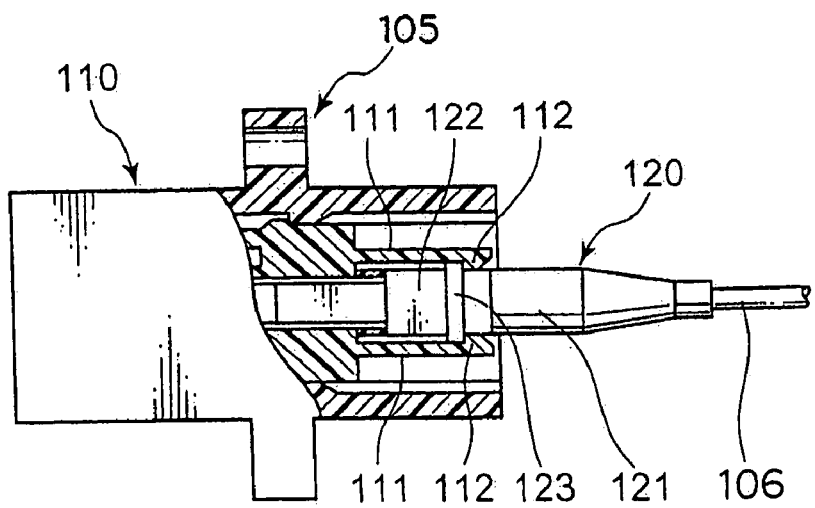
FIG. 1B is a partly sectioned side view of the optical connector 105 according to Patent Document 1.
Figure 2A:
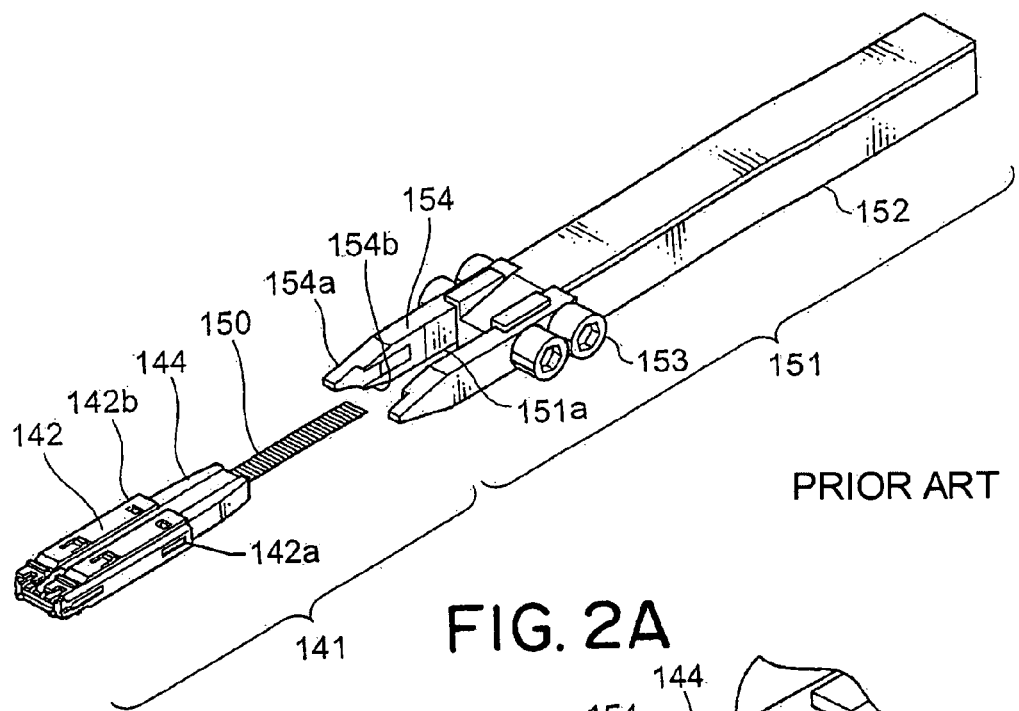
FIG. 2A is a perspective view of the overall structure according to Patent Document 2.
Figure 2B:
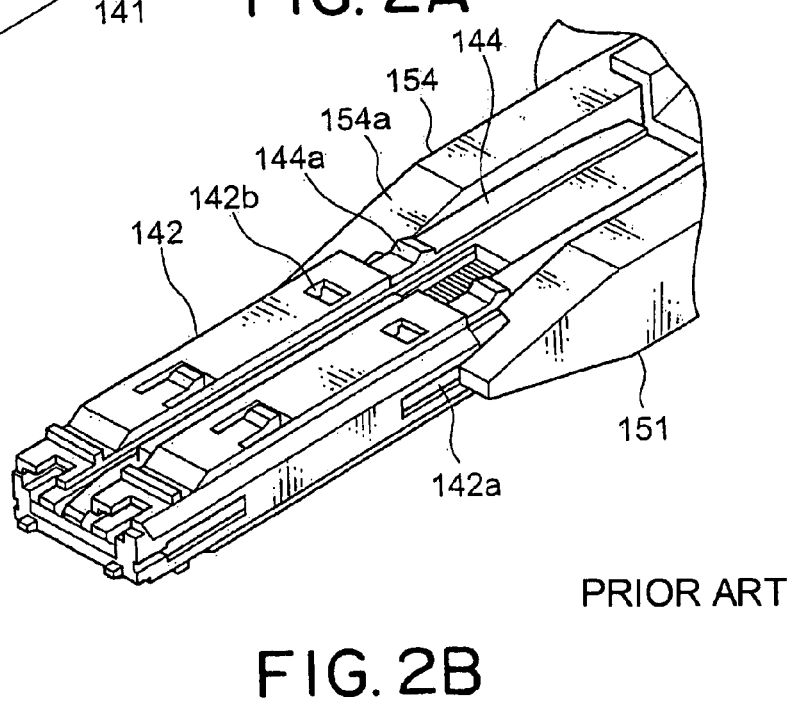
FIG. 2B is a diagram showing a state where a stopper 144 is pushed out of a shell member 142 by a reaction force (expansion force) of a coil spring according to Patent Document 2.
Figure 5A:
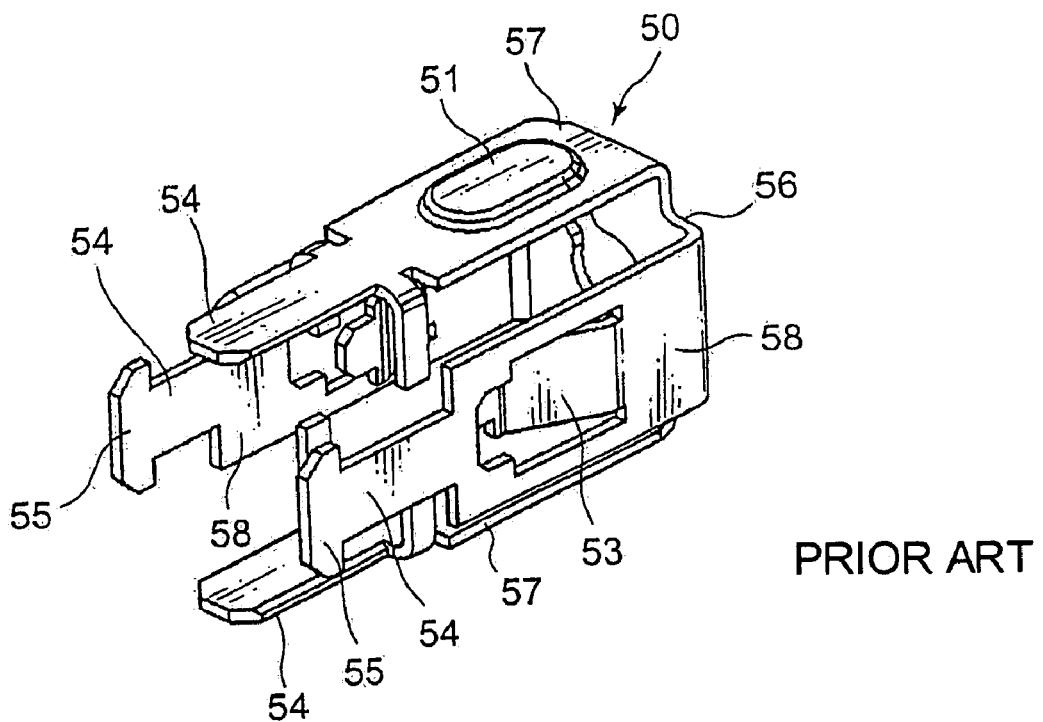
FIG. 5A is a perspective view, seen obliquely from the front, of an optical connector 50.
Figure 5B:
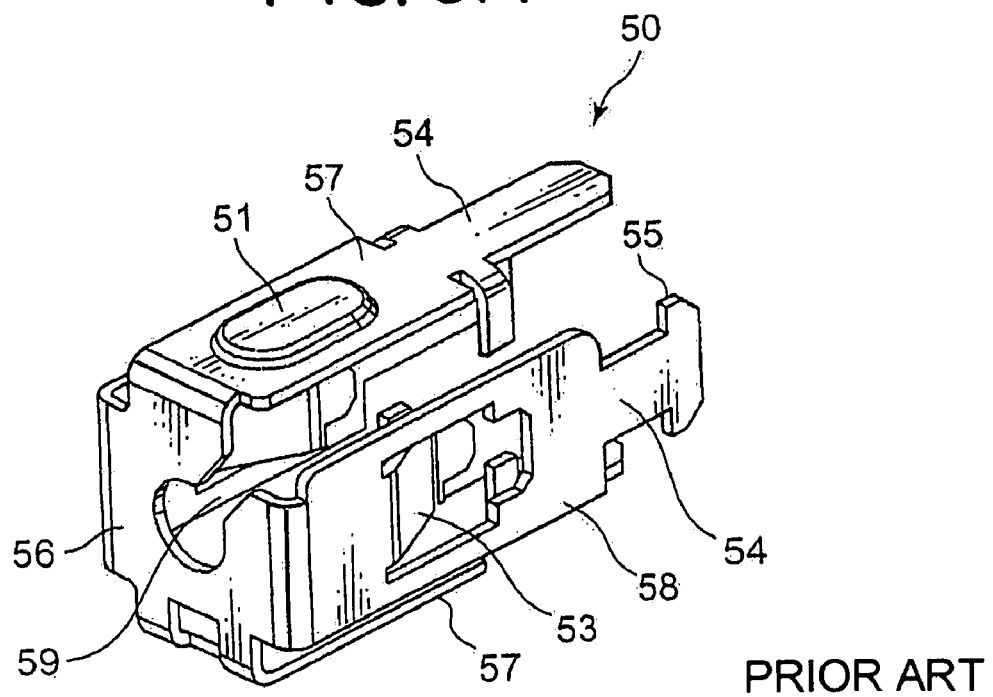
FIG. 5B is a perspective view, seen obliquely from the rear, of the optical connector 50.
Figure 6:
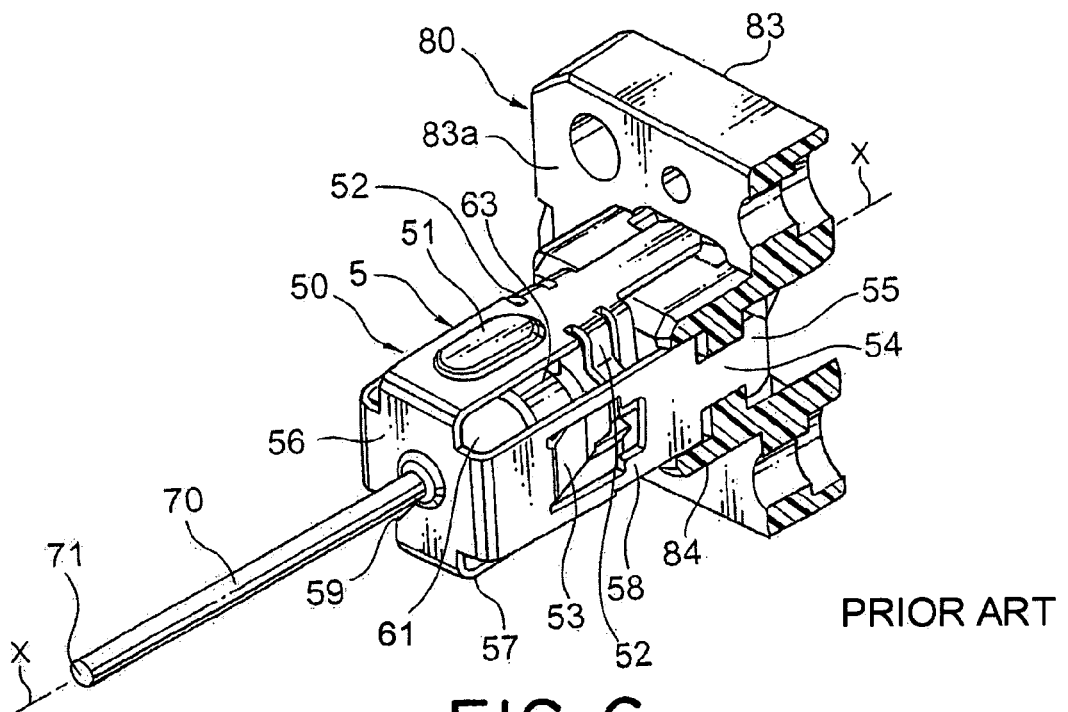
FIG. 6 is a diagram showing a section of part of a housing 80 of an optical connector apparatus shown in FIG. 3.
Figure 7:
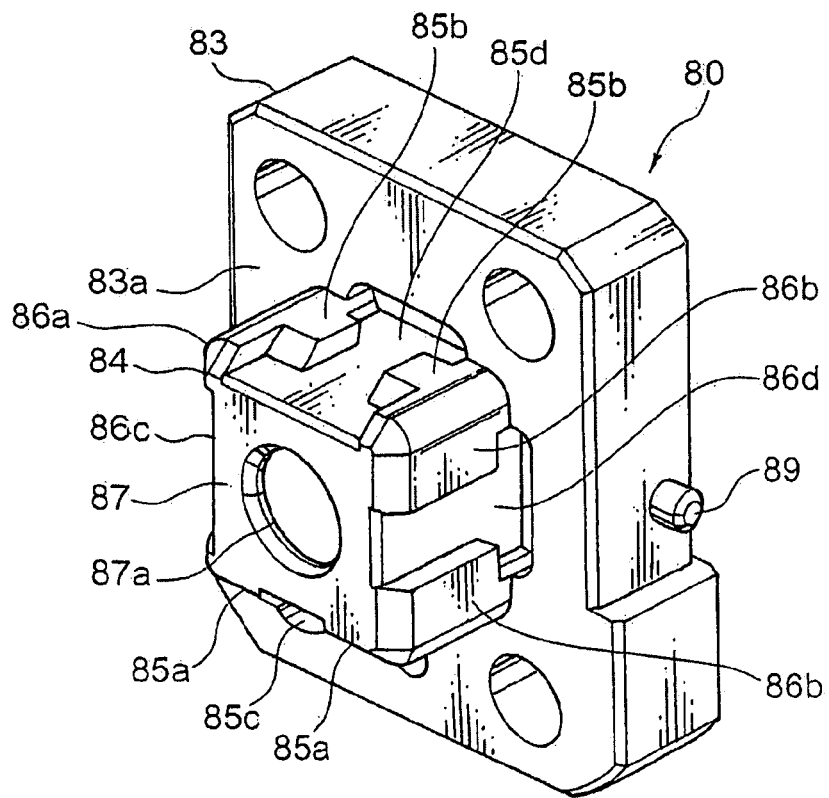
FIG. 7 is a perspective view showing a state where the housing 80 shown in FIG. 3 is rotated by 180 degrees.

FIG. 3 shows an optical connector according to the embodiment of this invention. In FIG. 3, there is shown a state where an optical connector apparatus having a housing and the optical connector held by the housing is attached to an adapter. FIG. 4 is a perspective view showing a ferrule of the optical connector shown in FIG. 3. FIGS. 5A and 5B are perspective views, seen obliquely from the front and obliquely from the rear, respectively, of an optical connector 50, wherein abutting portions 52 are not illustrated. FIG. 6 shows a section of part of a housing 80 of the optical connector apparatus shown in FIG. 3. FIG. 7 is a perspective view showing a state where the housing 80 shown in FIG. 3 is rotated by 180 degrees.

Referring to FIG. 3, the optical connector apparatus comprises an optical connector portion 5 and a housing 80 detachably holding the optical connector portion 5. The optical connector apparatus is connected to an adapter 90 so as to be connected to a mating optical connector (not shown) through the adapter 90.

The optical connector portion 5 comprises a ferrule 60 and an optical connector 50 as a holding member for holding the ferrule 60. The optical connector 50 having the ferrule 60 is called the optical connector portion 5.

Referring to FIG. 4, the ferrule 60 comprises a cylindrical ferrule body 61 and a flange portion 62 formed at an intermediate portion, in a direction of an optical axis X (see FIG. 6), of the ferrule body 61. The ferrule 60 is a PC (Physical Contact)-polished single-core ferrule in this embodiment, but may be an APC (Angled Physical Contact)-polished single-core ferrule.

The flange portion 62 is provided on the outer periphery of the ferrule body 61 and extends radially outward perpendicular to the optical axis X. The flange portion 62 has a plurality of to-be-positioned portions (cutout portions) 64 formed on its circumferential portion 63 about the optical axis X by cutting out a plurality of portions of the circumferential portion 63. Accordingly, the circumferential portion 63 of the flange portion 62 has a shape having a plurality of circular-arc surfaces intermittently formed in the circumferential direction.

One end portion of an optical cable 70 is inserted into the ferrule body 61 from its one end in the optical axis X direction so as to be held in the ferrule body 61. The optical cable 70 has an optical fiber 71 coated with a resin material. At the other end of the ferrule body 61, an end face of the optical fiber 71 inserted into the ferrule body 61 is located so as to be exposed. The end face of the optical fiber 71 is a portion that is butted and connected to an end face of a mating optical fiber of the non-illustrated mating optical connector.

Referring to FIGS. 5A and 5B, the optical connector 50 is in the form of a single thin elastic member.

Specifically, the optical connector 50 comprises first and second elongated plate-shaped beam portions 57 and 58 and a generally square plate-shaped base portion 56 mutually coupling one-end sides, each extending in a direction perpendicular to the optical axis X direction, of the first and second beam portions 57 and 58. The pair of opposed first beam portions 57 each have elasticity and are each provided at its free end with a neck portion 54 having a narrow width. The pair of opposed second beam portions 58 each have elasticity and are each provided at its free end with a neck portion 54 having a narrow width and further provided at a free end of the neck portion 54 with a coupling portion 55 projecting to both sides to increase the width thereof.

Each of the second beam portions 58 has an elastic piece 53 formed by slitting and bending inward a portion thereof. Further, one of the first beam portions 57 is formed with a convex portion 51.

In the optical connector 50, a space defined by the first and second beam portions 57 and 58 and the base portion 56 serves as a receiving portion for receiving therein the ferrule 60.

The optical connector 50 is formed only by a single thin plate member. When a metal plate is used as the plate member, the plate member is punched into a predetermined developed shape by pressing and then subjected to bending, thereby achieving the function of the holding member.

In this embodiment, the first beam portions 57 are both elastic. However, it may be arranged that at least one of the first beam portions 57 is elastic.

Each of the second beam portions 58 is formed with the elastic piece 53 having, like a cantilever spring, one end connected near the base portion 56 and a free end portion extending inward of the second beam portion 58. The pair of elastic pieces 53 are used for positioning the ferrule 60.

The elastic pieces 53 each have elasticity and serve to prevent tilting or rotation of the ferrule 60 in a direction crossing the optical axis X by engaging and abutting the cutout portions 64 formed on the flange portion 62 of the ferrule 60. It may be arranged that only one of the elastic pieces 53 has elasticity.

Further, one of the first beam portions 57 is formed, on the root side of the neck portion 54, with a pair of abutting portions 52 (see FIG. 6) that are bent to extend in a direction perpendicular to a plate surface of the first beam portion 57 and further bent parallel to the plate surface of the first beam portion 57 so as to extend toward plate surfaces of the second beam portions 58, respectively.

The abutting portions 52 serve to release the engagement between the cutout portions 64 of the flange portion 62 of the ferrule 60 and the elastic pieces 53 of the optical connector 50.

The abutting portions 52 abut the circumferential portion 63 of the flange portion 62 of the ferrule 60 so as to protrude in mutually opposite directions crossing the optical axis X, thereby serving to push open the second beam portions 58 having the elastic pieces 53 outward. It may be arranged that only one of the second beam portions 58 is formed with the elastic piece 53. It may be arranged that the abutting portions 52 are brought into contact with the circumferential portion 63 of the flange portion 62 when they are operated.

The length of the neck portion 54 of one of the second beam portions 58 from its root to the coupling portion 55 is set shorter than that of the other second beam portion 58.

The base portion 56 of the optical connector 50 is formed with a through hole adapted to receive and hold one end portion of the ferrule body 61 with the optical cable 70 inserted therein. Further, the base portion 56 has a cutout portion 59 formed by cutting out one side of the base portion 56 from the through hole thereof.

Referring also to FIGS. 6 and 7, the housing 80 comprises a generally square plate-shaped housing body 83 and a generally square plate-shaped fitting portion 84 projecting from one surface 83a of the housing body 83.

As best seen from FIGS. 6 and 7, the fitting portion 84 has a first side surface 85a, a second side surface 85b opposed to the first side surface 85a, a third side surface 86a and a fourth side surface 86b each adjacent to the first and second side surfaces 85a and 85b, and a fitting surface 87 parallel to the surface 83a of the housing body 83.

The first side surface 85a is formed with a first groove portion 85c whose bottom surface is lower in level than the first side surface 85a. The first groove portion 85c is adapted to receive the free end side of one of the first beam portions 57 of the optical connector 50 and has a shape corresponding to the free end portion of the neck portion 54 of the first beam portion 57. The second side surface 85b is formed with a second groove portion 85d whose bottom surface is lower in level than the second side surface 85b. The second groove portion 85d is adapted to receive the free end side of the other first beam portion 57 of the optical connector 50 and has a shape corresponding to the free end portion of the neck portion 54 of the other first beam portion 57.

The third side surface 86a is formed with a third groove portion 86c whose bottom surface is lower in level than the third side surface 86a. The third groove portion 86c serves as a locking portion adapted to receive and lock the free end side of one of the second beam portions 58 of the optical connector 50 and has a shape corresponding to the coupling portion 55 of the second beam portion 58.

The fourth side surface 86b is formed with a fourth groove portion 86d whose bottom surface is lower in level than the fourth side surface 86b. The fourth groove portion 86d differs in shape from the third groove portion 86c. The fourth groove portion 86d serves as a locking portion adapted to receive and lock the free end side of the other second beam portion 58 of the optical connector 50 and has a shape corresponding to the coupling portion 55 of the other second beam portion 58.

The fitting portion 84 is formed with an insertion hole 87a extending from a center portion of the fitting surface 87 of the fitting portion 84 to the housing body 83 for allowing the ferrule body 61 of the ferrule 60 to pass therethrough. The housing body 83 is formed with a housing hole (not shown) for insertion of the end portion of the ferrule body 61 inserted through the insertion hole 87a.

As shown in FIG. 3, the adapter 90 has an adapter housing 93 that is brought into contact with a surface, opposite to the surface 83a, of the housing body 83. On each of a pair of side surfaces of the adapter housing 93, a lever member 95 is rotatably mounted on a lever shaft portion 96. The lever member 95 is formed with a lever cutout portion 97 adapted to engage a shaft portion 89 provided on each of a pair of side surfaces of the housing body 83. The lever members 95 are connected together by a connecting member.

By rotating the lever members 95 in a predetermined direction (clockwise direction in FIG. 3), the housing 80 is integrally attached to the adapter 90.

Hereinbelow, a description will be given of the assembly of the optical connector portion 5 and the optical connector apparatus.

In order to incorporate the ferrule 60 into the optical connector 50, as shown in FIG. 6, the pair of second beam portions 58 are opened in mutually separating directions crossing the optical axis X. Then, the ferrule 60 is received in the space, between the elastic pieces 53, serving as the receiving portion inside the optical connector 50. In this event, the free end portions of the elastic pieces 53 are placed in the cutout portions 64 of the flange portion 62 of the ferrule 60 for preventing rotation of the ferrule 60.

In order to fit the optical connector portion 5 to the housing 80, the convex portion 51 provided on the first beam portion 57 having the abutting portions 52 is pushed toward the other first beam portion 57, so that the abutting portions 52 are displaced along the circumferential portion 63 of the flange portion 62 of the ferrule 60 to open the second beam portions 58 in the mutually separating directions crossing the optical axis X. After the second beam portions 58 are opened in the mutually separating directions crossing the optical axis X, the coupling portions 55 formed at the free ends of the second beam portions 58 can be smoothly moved along the third and fourth side surfaces 86a and 86b, respectively, of the fitting portion 84 of the housing 80 so as to be fitted in the third and fourth groove portions 86c and 86d, respectively.

In order to pull out the optical connector portion 5 from the housing 80, the convex portion 51 provided on the first beam portion 57 having the abutting portions 52 is pushed, so that the abutting portions 52 are displaced along the outer periphery of the flange portion 62 of the ferrule 60 to open the second beam portions 58 having the elastic pieces 53 in the mutually opposite directions away from the optical axis X. In this event, the coupling portions 55 locked by the fitting portion 84 of the housing 80 are released and, therefore, it is possible to smoothly pull out the optical connector portion 5 from the housing 80.

The optical connector of this invention shown in FIGS. 3 to 7 has the same structure as that shown in United States Patent Application No. 20080138016 (Japanese Unexamined Patent Application Publication (JP-A) No. 2008-145865), the disclosure of which is incorporated herein in its entirety by reference. Assembling jigs of first and second examples of this invention are each used for assembling and disassembling this optical connector.

Hereinbelow, a description will be given of the assembling jigs according to the first and second examples of this invention.

Figure 8:
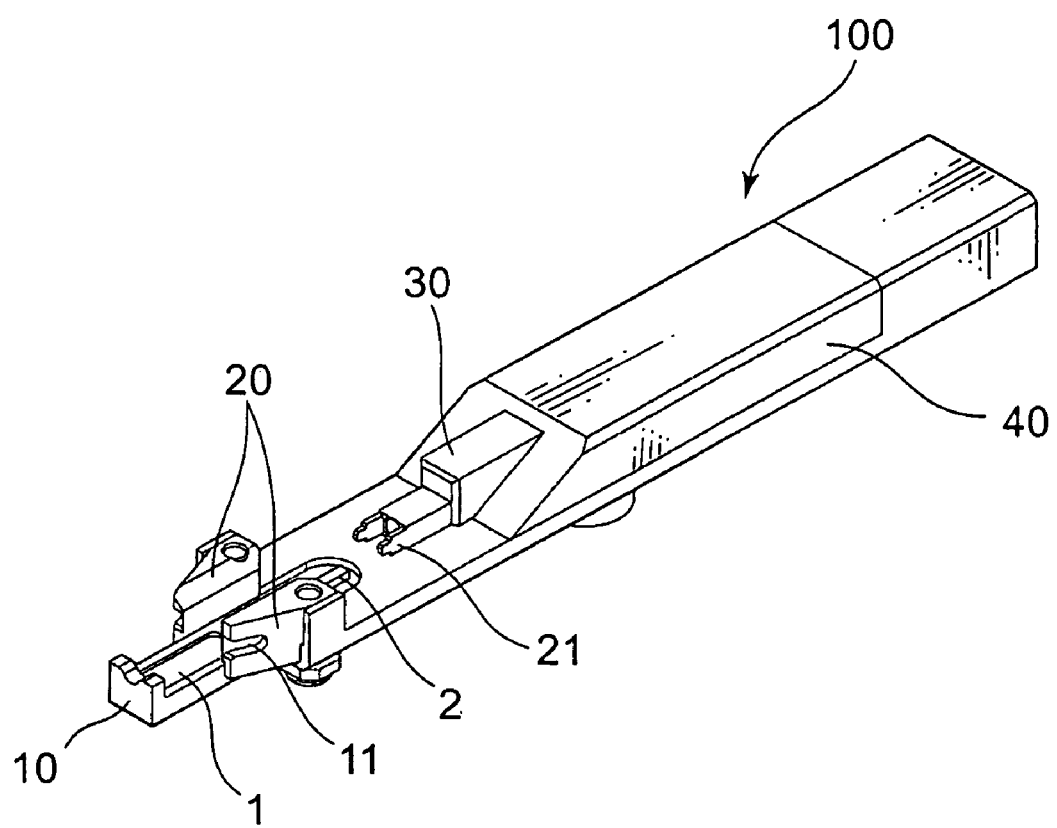
FIG. 8 is a perspective view showing an assembling jig according to a first example of this invention.

FIG. 8 is a perspective view showing the assembling jig according to the first example of this invention. Referring to FIG. 8, an assembling jig 100 comprises a box-shaped body portion 40, an optical connector receiving slide 10 movably held by the body portion 40 and serving as an optical connector receiving portion for receiving the optical connector portion 5 or the optical connector 50, a ferrule receiving slide 30 movably held by the body portion 40 and serving as a ferrule receiving portion for receiving the ferrule 60, and a tapered portion 20. The assembling jig 100 is used for attaching or detaching the ferrule 60 holding the optical cable 70 having the optical fiber 71 to or from the optical connector 50.

The optical connector receiving slide 10 has an optical connector receiving concave portion 1 for holding the optical connector portion 5 or the optical connector 50 when assembling the optical connector portion 5 or the optical connector 50, and a projecting portion 2 for preventing rotation of the ferrule 60.

The tapered portion 20 serves to abut the pair of second beam portions 58 so as to open them outward. The tapered portion 20 has a pair of guide grooves 11 each extending in a longitudinal direction thereof and, using these guide grooves 11, prevents the optical connector portion 5 or the optical connector 50 from coming off the assembling jig 100. The ferrule receiving slide 30 has a ferrule checking portion 21 adapted to engage the cutout portions 64 of the ferrule 60 for preventing rotation of the ferrule 60.

FIGS. 9A, 9B, and 9C and FIGS. 10A, 10B, and 10C are perspective views showing an example of using the assembling jig shown in FIG. 8.

Figure 9A:
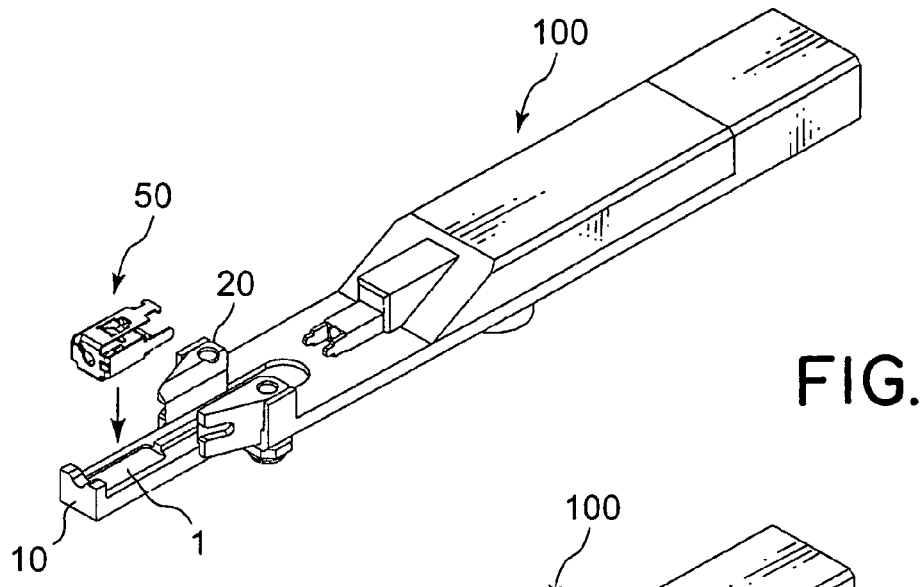
FIGS. 9A, 9B, and 9C and FIGS. 10A, 10B, and 10C are perspective views showing an example of using the assembling jig shown in FIG. 8.

Referring to FIG. 9A, the optical connector 50 is set on the optical connector receiving concave portion 1.

Figure 9B:
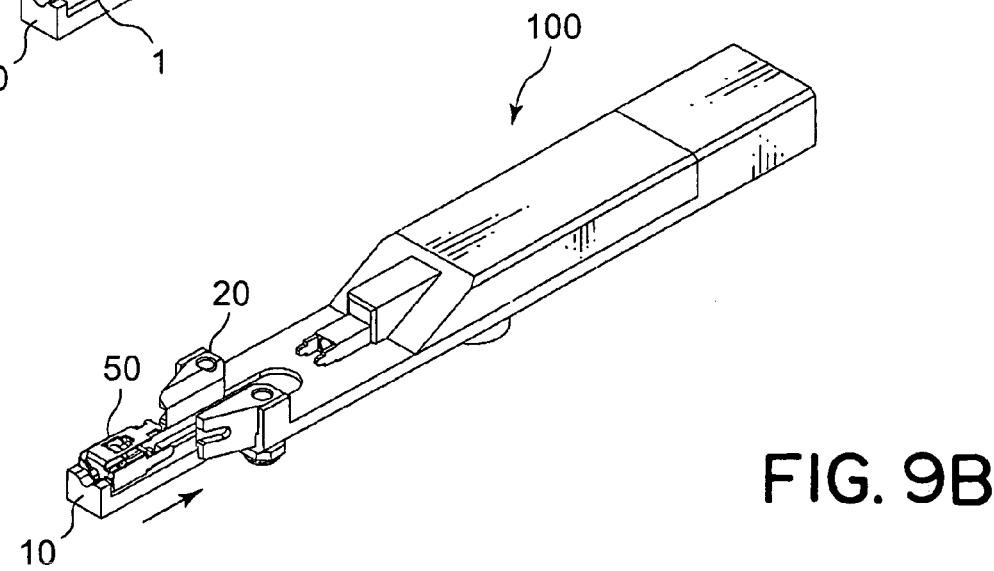

Referring to FIG. 9B, the optical connector receiving slide 10 is caused to slide toward the tapered portion 20, thereby opening the second beam portions 58 of the optical connector 50 by means of the tapered portion 20.

Figure 9C:
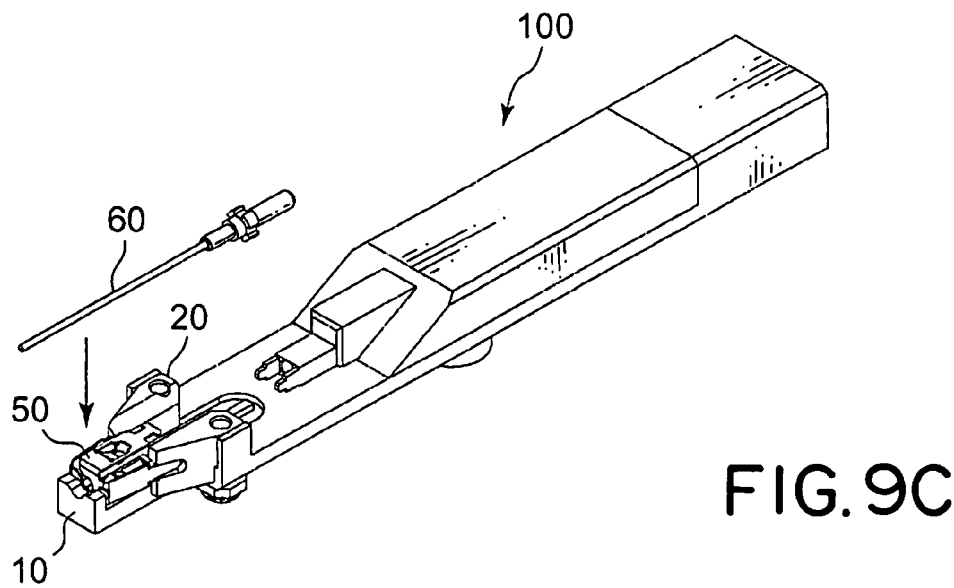

Referring to FIG. 9C, the optical cable 70 of the ferrule 60 is caused to pass through the optical connector 50.

Figure 10A:
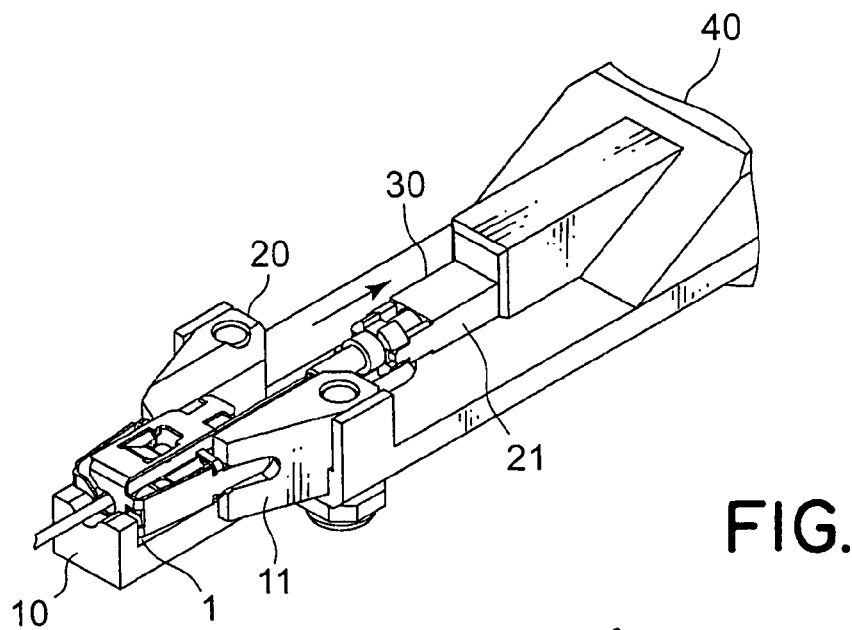

Referring to FIG. 10A, the ferrule 60 with the optical cable 70 is set on the ferrule receiving slide 30.

Figure 10B:
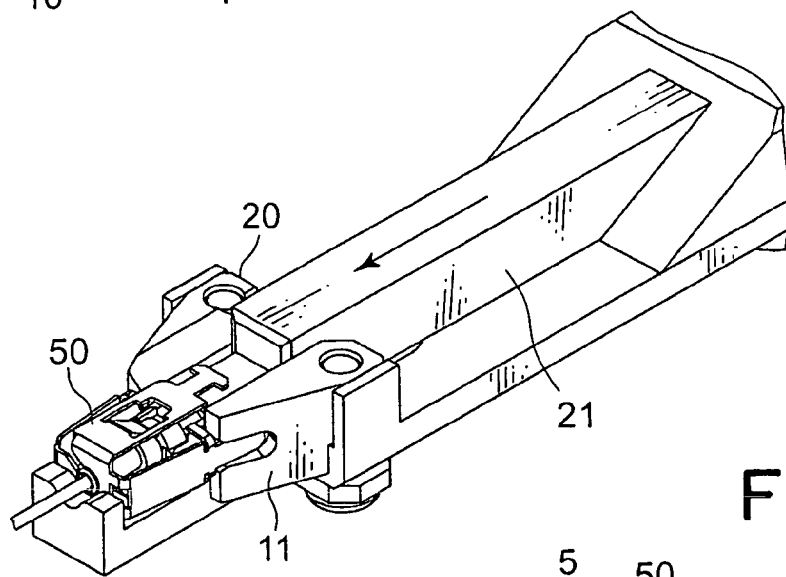

Referring to FIG. 10B, the ferrule receiving slide 30 having the ferrule 60 with the optical cable 70 set thereon is caused to slide as shown by an arrow.

Figure 10C:
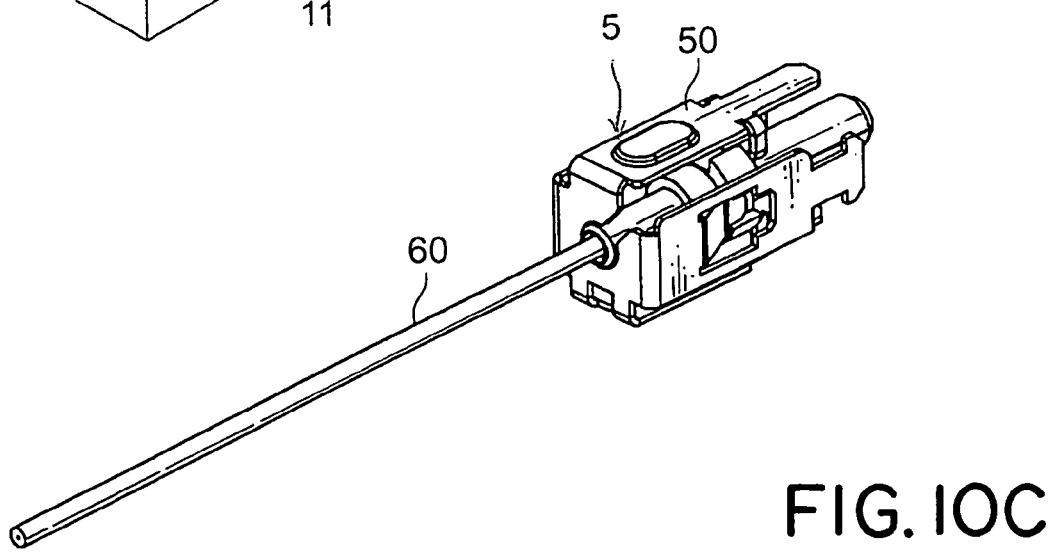

Referring to FIG. 10C, the optical connector is removed from the assembling jig 100, thereby completing the optical connector portion 5.

Figure 11:
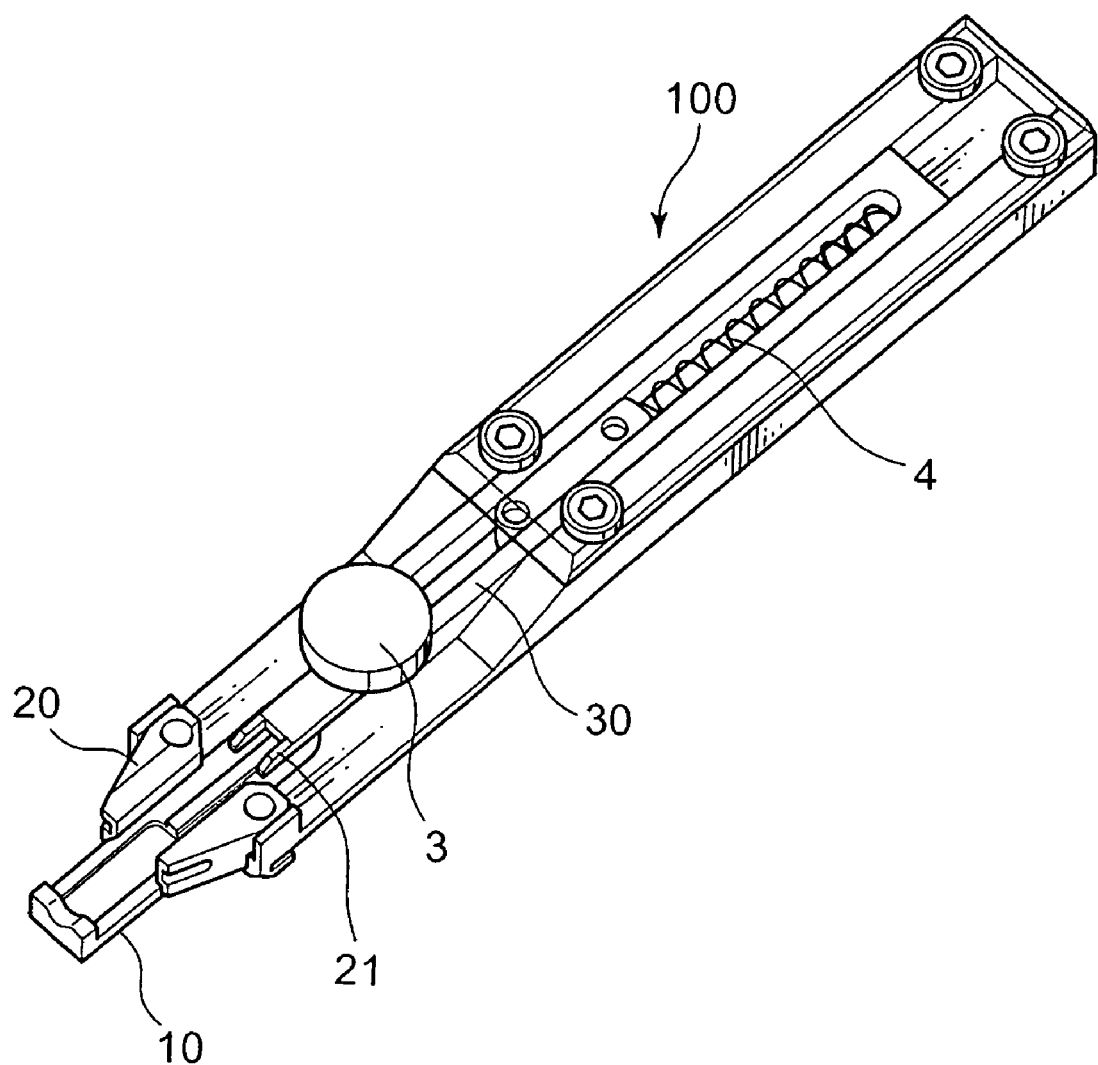
FIG. 11 is a perspective view showing an assembling jig according to a second example of this invention.

FIG. 11 is a perspective view showing the assembling jig according to the second example of this invention.

Referring to FIG. 11, the assembling jig according to the second example of this invention differs from that according to the foregoing first example in that an elastic member such as a spring 4 is incorporated inside in order to prevent backlash of a ferrule checking portion 21 and to urge a ferrule receiving slide 30 toward a side opposite to a side where an optical connector receiving slide 10 is disposed.

A knurl 3 is provided for facilitating an operation to cause the ferrule receiving slide 30 to slide toward the side of the optical connector receiving slide 10 against an urging force of the spring 4.

As described above, using the slide mechanisms, this invention is applicable to a PC (Physical Contact)-polished single-core ferrule or an APC (Angled Physical Contact)-polished single-core ferrule when assembling an optical connector formed only by a single thin elastic member and having a ferrule holding an optical fiber (see United States Patent Application No. 20080138016 (Japanese Unexamined Patent Application Publication (JP-A) No. 2008-145865)). The number of parts can be minimized to reduce the cost. This invention is applicable to both assembly and disassembly of the optical connector. Since the shell member of the optical connector is formed by the single member, the optical connector can be assembled with no concern about a change in internal structure.

Further, even if the tapered portion of the assembling jig is damaged, it is replaceable. Thus, the maintenance is also ensured.

Further, according to this invention, using the slide mechanisms such as the optical connector receiving slide 10 and the ferrule receiving slide 30, an optical connector formed by a single metal plate (see United States Patent Application No. 20080138016 (Japanese Unexamined Patent Application Publication (JP-A) No. 2008-145865)) can be easily assembled and disassembled regardless of place.

As described above, the optical connector assembling jigs of this invention are applied to assembly and disassembly of optical connectors for use in optical communications and so on.

While this invention has been described in terms of the embodiment and the first and second examples, this invention is not limited thereto, but is applicable by variously changing them and optionally combining them. It is needless to say that this invention can be carried out with various changes in a range not exceeding the concept of this invention and those configurations with the changes are also included in the scope of this invention.

What is claimed is:

1. An optical connector assembling jig for assembling an optical connector, the optical connector including a pair of beam portions having elasticity and adapted to hold a ferrule holding an optical fiber, comprising:
 a body portion;
 an optical connector receiving portion movably held by the body portion and adapted to receive the optical connector;
 a ferrule receiving portion movably held by the body portion and adapted to receive the ferrule; and
 an abutting portion adapted to abut the pair of beam portions to open the pair of beam portions outward,
 wherein the optical connector is assembled by receiving and holding the optical connector at the optical connector receiving portion, moving the optical connector receiving portion to open the pair of beam portions outward by the abutting portion, receiving and holding the ferrule at the ferrule receiving portion, and moving the ferrule receiving portion toward the optical connector receiving portion.

2. The optical connector assembling jig according to claim 1, wherein:
 the optical connector receiving portion has an optical connector receiving concave portion for holding the optical connector when assembling the optical connector, and a projecting portion for preventing rotation of the ferrule.

3. The optical connector assembling jig according to claim 1, wherein:
 the abutting portion has a guide groove for preventing the optical connector from coming off the optical connector assembling jig.

4. The optical connector assembling jig according to claim 3, wherein:
 the abutting portion has a tapered form.

5. The optical connector assembling jig according to claim 1, wherein:
 the ferrule has a cutout portion, and
 the ferrule receiving portion has a checking portion adapted to engage the cutout portion of the ferrule for preventing rotation of the ferrule.

6. The optical connector assembling jig according to claim 1, further comprising:
 an elastic member for urging the ferrule receiving portion toward a side opposite to a side where the optical connector receiving portion is provided.

7. The optical connector assembling jig according to claim 6, wherein:
 the elastic member is a spring.

8. The optical connector assembling jib according to claim 6, further comprising:
 an operating member for performing an operation to cause the ferrule receiving portion to slide toward the side where the optical connector receiving portion is provided, against an urging force of the elastic member.

* * * * *

UNITED STATES PATENT AND TRADEMARK OFFICE
CERTIFICATE OF CORRECTION

PATENT NO. : 7,720,345 B2 Page 1 of 1
APPLICATION NO. : 12/284507
DATED : May 18, 2010
INVENTOR(S) : Katagiyama et al.

It is certified that error appears in the above-identified patent and that said Letters Patent is hereby corrected as shown below:

In particular, on the cover page, column 1, item [30], please add the Foreign Application Priority data as follows:

--November 1, 2007 (JP) ..................... 2007-285580--.

In Column 10, line 57 (Line 1 of Claim 8), after the word "assembling", please change "jib" to correctly read: --jig--.

Signed and Sealed this

Third Day of August, 2010

David J. Kappos
*Director of the United States Patent and Trademark Office*